April 3, 1951     S. H. M. DODINGTON     2,546,985

ALTITUDE INDICATING SYSTEM

Filed Feb. 26, 1947

INVENTOR.
SVEN H. M. DODINGTON

BY

*ATTORNEY*

Patented Apr. 3, 1951

2,546,985

UNITED STATES PATENT OFFICE 2,546,985

ALTITUDE INDICATING SYSTEM

Sven H. M. Dodington, Nutley, N. J., assignor to International Standard Electric Corporation, New York, N. Y., a corporation of Delaware Application February 26, 1947, Serial No. 730,935

10 Claims. (Cl. 343—6)

This invention relates to a system for rendering certain information or control service between remote stations, and particularly of the type utilizing radiant energy pulses.

In my co-pending application, Serial Number 643,701, filed January 25, 1946, now Patent No. 2,535,038, issued December 26, 1950, there is described a position indicating system wherein a display of objects, such as aircraft in the vicinity of a radio lighthouse station, is obtained not only in the lighthouse station, but also in suitably equipped airplanes within said vicinity. The present application may be considered as an improvement and extension of the altitude layering system therein described.

The method of producing altitude layering, which has been described in the above-mentioned co-pending application, consists of transmitting from the aircraft, in response to interrogation from the ground, a pair of pulses spaced from each other by a distance corresponding with the barometric altitude of the aircraft. The pair of pulses, when received on the ground, are used to produce an output pulse whose width is determined by the spacing between the pairs of pulses which correspond to the altitude of the aircraft. The output pulse is applied to a voltmeter which sums up the total energy of the output pulse and gives a reading which can be calibrated to read altitude directly.

One of the objects of this invention is to provide means for a radio lighthouse station to selectively view the number of objects, such as aircraft, at predetermined indicating positions, such as different altitude layers.

The above-mentioned and other features and objects of this invention will become more apparent; and the invention, itself, though not necessarily defined by said features and objects, will be best understood by reference to the following description of an embodiment of the invention taken in connection with the accompanying drawings wherein.

Figure 1:
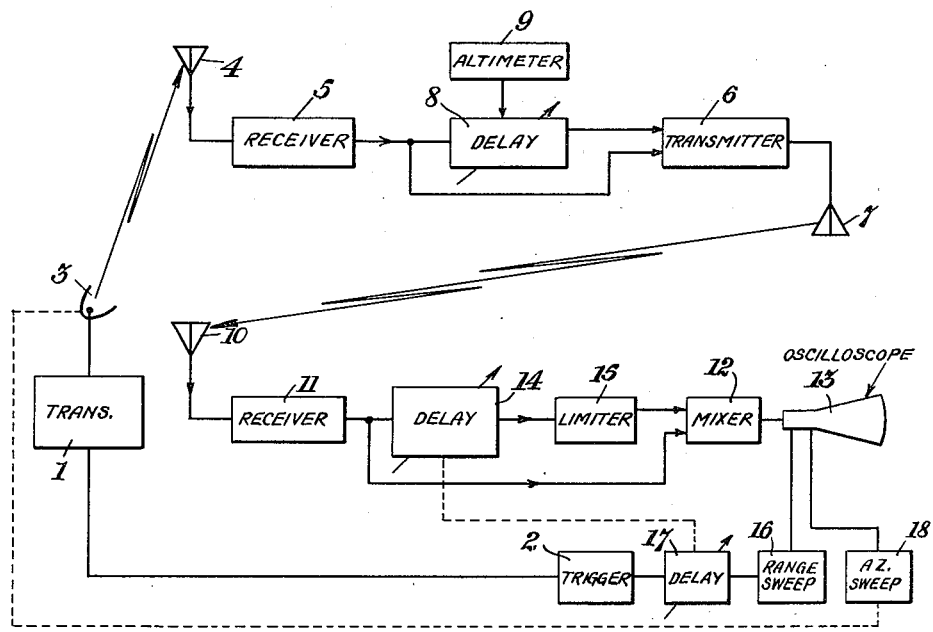
Figure 1 shows an embodiment of applicant's invention in block diagram form.

Figure 1 shows radio lighthouse equipment comprising a transmitter 1 triggered by circuit 2 for transmitting challenging pulses from the directional antenna system 3. The challenging pulse, when received by the aircraft antenna 4 and passed through the aircraft receiver 5, is first used to trigger the aircraft transmitter 6 for transmitting from antenna 7 a first response pulse. The challenge pulse received by receiver 5 is also passed through a delay circuit 8 where it is time delayed in accordance with the barometric altitude of the aircraft under control of altimeter 9. This delayed pulse is then used for triggering the aircraft transmitter 6 for producing a second response pulse from antenna 7. The time interval between the first and second response pulses corresponds to the barometric altitude of the aircraft.

Figure 2:
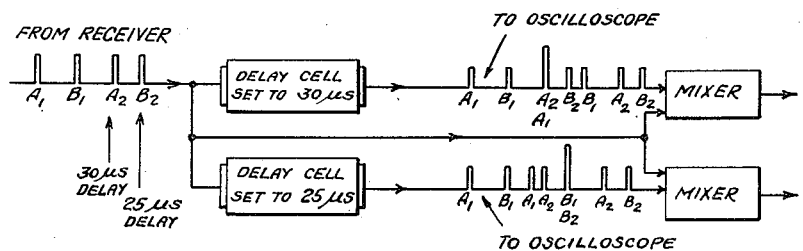
Figure 2 shows in block diagram form a circuit arrangement for viewing aircraft flying at several different altitude layers.

The first response pulse transmitted from antenna 7 is passed in succession through the radio lighthouse receiving antenna 10 and receiver 11. At the output of the radio lighthouse receiver 11, there would appear two pulses A1 and A2, as shown in Figure 2, corresponding to the two pairs of pulses transmitted from the aircraft. The first pulse A1 is passed directly from the receiver 11 to the receiver 12 but is of insufficient amplitude to pass mixer 12 and so does not appear on oscilloscope 13. The A1 pulse from the output of receiver 11 is also passed through the variable delay cell 14 which has been set by the ground operator to provide a delay corresponding to the delay of the pulse transmitted for the altitude of the aircraft to be observed. After passing through limiter 15, this delayed first pulse appears at the mixer 12. If the variable delay cell 14 has been properly set by the ground station operator for the altitude of the particular aircraft, the second pulse A2 from antenna 7 will have passed through the radio lighthouse receiver 11 and appear directly at the input to the mixer 12 simultaneously with the delayed first pulse A1. Thus the two inputs combine to produce an enlarged pulse consisting of A1 delayed through delay cell 14, and A2, as shown in Figure 2, which is of sufficient amplitude to pass mixer 12 and appear on the oscilloscope screen. The oscilloscope 13 is coupled to a range sweep circuit 16 and provides a range trace on its screen. Since the time separation of the pulse passed through mixer 12 to the oscilloscope 13 from the original trigger pulse from source 2 includes the delay time of the intelligence due to the delay device 8 as well as the range time of the aircraft from the radio lighthouse, it is desirable that the intelligence delay time be subtracted from the indication displayed on the screen of oscilloscope 13. Hence the trigger pulse from trigger device 2 is first passed through a delay device 17 whose delaying action is timed with that of the delay device 14. Thus the delayed trigger signals passed to the range sweep 16 start the sweep at a time later than the transmitter trigger time by the interval due to the delay device 9, and therefore the oscilloscope shows true range indications of aircraft at the desired viewing altitude established by the setting of delay device 14. An azimuth sweep circuit 18 synchronized with the rotation of the antenna system 3 provides azimuth indications for the range trace displayed on the screen of oscilloscope 13.

A system for viewing aircraft at different elevation layers is further shown in Figure 2, where pulses due to two aircraft are being simultaneously received. Pulses from the first aircraft are A1 and A2, respectively; pulses from the second aircraft B1 and B2, respectively. The altitude of a first aircraft A is such as to give a 30-microsecond delay, while the altitude of a second aircraft B produces a 25-microsecond delay. When these pulses are passed through delay cells set to 30 microseconds and 25 microseconds, the output quite definitely shows the second pulse from each aircraft. It is, of course, also true that a delay cell 15 or 16 preset for the delay between A1 and B1 or B1 and A2 or A2 and B2 would also give an indication. These indications would, however, last for only a few seconds at a time, as it is unlikely that two aircraft would maintain a fixed difference in slant distance from the beacon while remaining at the same azimuth.

In any event, every aircraft with its correct altitude will be shown. Only occasionally would spurious aircraft appear. In general, this is a characteristic of plan position indicator presentation in that spurious signals, caused by interference are very often received but can nearly always be recognized by the shortness of their duration.

If the original delay setting on the aircraft is made by means of a delay cell, it will be seen that we have a very simple automatic method of showing on an airplane oscilloscope, all aircraft at its own altitude only.

Where it is desired to view adjacent layers on the same oscilloscope screen it is only necessary to broaden the pulses passed through the delay cells, so as to give greater overlap.

It will be appreciated, of course, that a correction of the starting time of the scan on all plan position indicator scopes has to be introduced by using this system. This may be, however, automatic so that the scan delay is shifted when switching from one delay to a different altitude delay as for example indicated in trigger 1. This would apply both to the ground display and to the aircraft display.

The use of delay circuits, for example liquid delay cells, for coding the airplane distance interrogations results in simple, reliable, and readily detectable information being supplied when repeated by a radio lighthouse station. The use of these circuits also permits the use of twin pulses spaced by a large amount, thus reducing multi-path clutter, without causing excessive ambituity when two aircraft are close together at the same azimuth.

While I have described above the principles of my invention in connection with specific apparatus, it is to be clearly understood that this description is made only by way of example and not a limitation on the scope of my invention.

What is claimed is:

1. In a radio indicating system wherein a plurality of objects are provided with means for transmitting from remote locations electrical signals separated from each other by a time interval corresponding to characteristic information, means for receiving said signals comprising a receiver, a mixer circuit, a variable delay device, an indicator, means for applying said received electrical signals directly to said mixer circuit, means for applying said received signals to said mixer circuit through said variable delay device whereupon said last-named signals are delayed for a selected interval of time, means for controlling the delay time of said device to correspond with the separation desired to select, signals of said selected delay passing through said device arrive at the mixer coincident with the time of arrival of the separated signals applied directly to said mixer circuit, means for applying said coincident signals to said indicator whereby indication of objects with the characteristic information corresponding to the selected separation will be indicated.

2. In a radio indicating system wherein a plurality of objects are provided with means for transmitting in response to interrogation from a remote location a pair of pulses spaced from each other by a time interval corresponding with characteristic object information, means for receiving said spaced pulses comprising a receiver, a mixer circuit, a delay device adjustable to a predetermined one of said time intervals an indicator, means for applying the first received and the second received pulses of each pair directly to said mixer circuit, means for applying said first and second received pulses through said delay device to said mixer, whereby coincidence of said delayed first pulse and said second pulse will result at said mixer when separated by the predetermined time interval and means for applying the output of said mixer circuit to said indicator whereby indications of objects with the characteristic object information corresponding to the said delay will be indicated.

3. In a radio indicating system wherein a plurality of objects are provided with means for transmitting characteristic information responsive to interrogation from a remote location, said information comprising electrical pulses separated by a time interval corresponding to said information, means for receiving said separated pulses comprising a receiver, a mixer circuit, a variable delay device, and indicator, means for applying one portion of said received pulses directly to said mixer circuit, means for applying another portion of said received pulses through said variable delay device to said mixer, means for selecting pulses applied to said mixer circuit in time coincidence and means for applying the selected pulses to said indicator.

4. In a radio indicating system wherein a plurality of objects are provided with means for transmitting in response to interrogation from a remote location electrical pulses spaced from each other by a time interval corresponding with characteristic object information, means for receiving said spaced pulses comprising a receiver, a mixer circuit, a variable delay device, an indicator, means for applying said received pulses directly to said mixer circuit, means for applying said received pulses to said variable delay device whereby said pulses are delayed for a selected interval of time, means for limiting said delayed pulses and for applying said limited pulses to said mixer, whereby the first pulses of pairs spaced an interval corresponding with said delay arrive at the mixer coincident with the time of arrival of the second pulses of these pairs applied directly to said mixer circuit, coincident, and means for applying said coincident pulses to said indicator whereby indication of objects with the characteristic object information corresponding to said time interval spacing will be displayed.

5. In a radio indicating system, means at a given location, for indicating characteristic information of objects around it comprising means at substantially the same location as said indicator for transmitting challenging signals to said objects, means on said objects for automatically sending electrical response signals back to said location, said latter means including receiving means for receiving said challenging signals, a transmitter responsive to said received signals for sending a first reference response signal back to said location, means for delaying said received signals for predetermined time interval comprising a delay means, means for controlling the interval of time delay of said delay means in accordance with said characteristic information and means for applying said delayed signals to said transmitter for transmission back to said location, means at said location for receiving said reference and delayed response signals, a mixer circuit, a delay device having adjustable means for selecting an interval of time delay, means for applying said received reference and delayed response signals to said mixer, means for applying said location received reference and delayed response signals through said delay device to said mixer circuit whereby, upon the proper selection of said interval of time delay, the reference signals passing through said device are delayed for a sufficient time to arrive at the mixer coincident with the time of arrival of the delayed signals applied directly to said mixer circuit.

6. In a radio indicating system means at a given location for indicating characteristics information of objects around it comprising means at substantially the same location as said indicator for transmitting challenging signals to said objects, means on said objects for automatically sending response signals back to said location, said latter means including receiving means for receiving said challenging signals, a transmitter responsive to said received signals for sending a reference response signal back to said location, means for delaying said received signals for a predetermined time interval comprising a delay means, means for controlling the interval of time delay of said delay means in accordance with said characteristic information, and means for applying said delayed signals to said transmitter for transmission back to said location, means at said location for receiving said reference and delayed response signals, mixer circuit, a delay device having adjustable means for selecting an interval of time delay, means for applying said received reference and delayed response signals to said mixer, means for applying said location received reference and delayed response signals through said delay device to said mixer circuit whereby coincidence of said reference signals passing through said device and the delayed signals applied directly to said mixer circuit will result at said mixer upon the proper selection of said interval of time delay, and means for applying said coincident signals to said indicator for indicating said characteristic object information.

7. An indicating system as set forth in claim 6 wherein said indicator comprises a cathode ray oscilloscope, means for producing a time base trace on the screen of said oscilloscope, a time base delay device, means for timing said time base producing means through said time base delay device with said challenging transmitting means, said last named delay device being timed with said delay device whereby the start of the time base trace is delayed for a time interval corresponding with the time interval selection of said delay device.

8. In a radio indicating system an indicator at a given location for indicating characteristic information of objects around it means at substantially the same location as said indicator for transmitting challenging electrical pulses to said objects, means on said objects for automatically sending response pulses back to said location, said latter means including means for receiving said challenging pulses, a transmitter, means for triggering said transmitter for sending a reference response pulse back to said location comprising said received pulse, means for delaying said received signals for a predetermined time interval comprising a delay means, means for controlling the interval of time delay of said means in accordance with said characteristic informations, means for applying said delayed response pulse to said transmitter for transmission means at said location for receiving said reference and delayed response pulses a mixer circuit, a device having adjustable means for selecting an interval of time delay, a signal limiter device, means for applying said received reference and delayed response pulses to said mixer, means for applying said received reference and delayed response pulses through said delay device and limiter to said mixer circuit whereby coincidence of said reference response pulse passing through said device and the delayed pulse applied directly to said mixer circuit will result at said mixer upon the proper selection of said interval of time delay, and means for applying said coincident pulses to said indicator for indicating said characteristic information.

9. An indicating system as set forth in claim 5, wherein said objects include indicating means, and adjustable control means for selecting an interval of time delay of said delay means whereby objects with the characteristic object information corresponding to said selected delay will be displayed.

10. An indicating system as set forth in claim 5 wherein said transmitting means at substantially the same location as said indicator comprises a rotatable directive transmitter, and said indicator comprises an oscillograph, means for producing a time base trace on the screen of said oscillograph, which is time delayed in accordance with said selected interval of time delay whereby time range indications of objects providing said characteristic information is displayed, the sweep of said time base trace being synchronized with the rotation of said directive transmitter for displaying the azimuth of said last named objects.

SVEN H. M. DODINGTON.

REFERENCES CITED

The following references are of record in the file of this patent:

UNITED STATES PATENTS

| Number | Name | Date |
| --- | --- | --- |
| 2,252,083 | Luck | Aug. 12, 1941 |
| 2,405,238 | Seeley | Aug. 6, 1946 |
| 2,419,525 | Alford | Apr. 29, 1947 |
| 2,423,082 | Busignies | July 1, 1947 |